Aug. 13, 1968     E. R. WOOD     3,396,950

DIFFUSER FOR SEWAGE TREATMENT

Filed Jan. 16, 1967

INVENTOR.
ELMER R. WOOD
BY Robb & Robb
Attorneys

United States Patent Office 3,396,950
Patented Aug. 13, 1968

3,396,950
DIFFUSER FOR SEWAGE TREATMENT
Elmer R. Wood, 8666 Broadview Road,
Cleveland, Ohio 44141
Filed Jan. 16, 1967, Ser. No. 609,403
3 Claims. (Cl. 261—122)

ABSTRACT OF THE DISCLOSURE

This invention is directed to sewage treatment means and particularly to a diffuser, which diffuser incorporates therein means to distribute fine bubbles of air or the like through a sewage mixture to assist in the digestion process, and at the same time to provide means for directing to said mixture simultaneously a heavy stream of air or the like which will effectively roll the mixture so as to assist in the supplying of oxygen to make the process more effective.

---

This invention relates to sewage treatment systems, and more particularly to means to improve the aeration which is availed of in aerobic treatment applications.

Even more particularly this invention relates to certain diffuser means for distributing air in a sewage treatment tank and to create conditions within the tank wherein the aeration of the sewage mixture therewithin is substantially increased as to its effectiveness. Generally speaking, while aeration has been well known for many years, and various types of means to effect aeration have been adopted and put into use, in every case where increased aeration is possible, increased improvement in the actual treatment of the sewage therein under the aerobic system is the result and to that end the present invention is directed to such improvement as is very marked over that heretofore provided by prior systems.

With the foreging in mind then, it is a principal object of this invention to provide a means for increasing the aeration of sewage material in a sewage treatment system of the aerobic type by the provision of improved diffuser means provided therefor and availing of air directed to such diffuser means to assist in the reduction of solid particles in size so as to take advantage of the improved aeration available.

It is a further object of this invention to provide a novel form of diffuser head which includes the provision of a porous material therefor through which air may be forced, such porous material likewise having an opening from which a large quantity of air may be discharged into the mixture to roll the same in order to increase the effectiveness of the aeration provided by the finer air bubbles.

Another object of the invention is to provide a novel face plate for use in the head heretofore referred to, which face plate may be preferably comprised of a uniform grade of porous ceramic material particles which are bonded together, the particles thus providing for delivery of fine bubbles of air to the mixture, and further said ceramic material having an opening therein through which a large stream of air may be directed to roll the mixture and thus improve the aeration as heretofore suggested.

Another object of the invention is to provide a novel form of air distributing head which is made of a uniform grade of porous ceramic material particles bonded together, the particles being formed of uniformly graded quartz sand bonded together by a vitreous silicate.

Other and further objects of the invention will be understood from a consideration of the specification appended hereto and disclosed in the drawing wherein.

Figure 1:
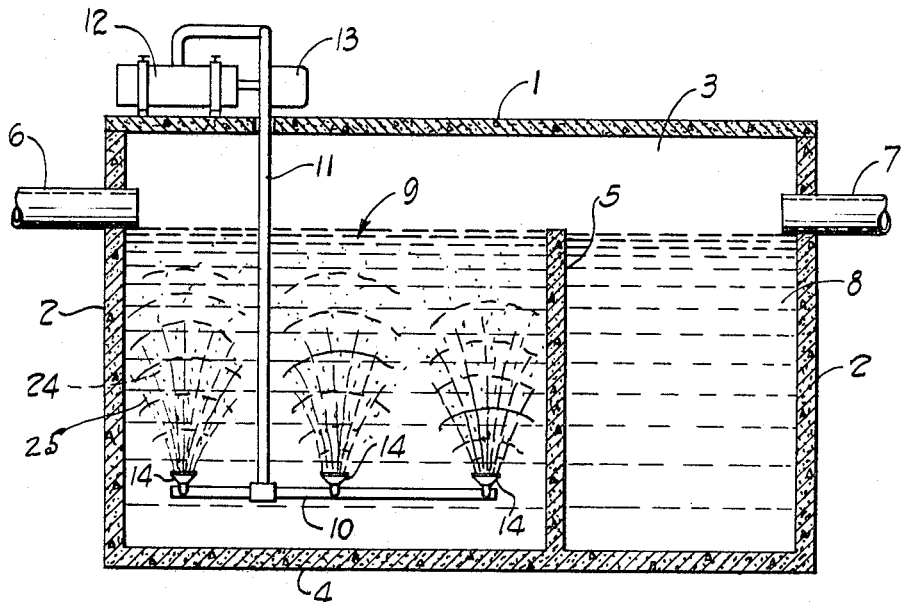
FIGURE 1 is a cross sectonal view through one form of sewage treatment system, and specifically the tank thereof illustrating the general location of the various elements in such a system and suggesting the movement of air where the distributing heads of this invention are positioned for that purpose.

Referring now to FIGURE 1, the sewage treatment system to which this invention may be adapted and in which the same has been found useful, is disclosed as one including a typical tank generally designated 1, of generally rectilinear configuration including the top 1a, ends 2, and sides 3, one of the latter being cut away, the sides and ends in most cases being formed integrally with a bottom 4.

The tank is provided with a baffle 5, so as to maintain the level of the mixture of sewage therewithin about as indicated near the inlet 6, the outlet 7 providing for outflow of effluent from a compartment 8 within the tank.

In the compartment designated 9, the aeration provided by the means of this invention is designed to take place, and to that end there is provided within the said compartment 9, a manifold 10 being preferably near the bottom 4 of the tank, to be supplied with air by an upwardly extending line 11 which in turn is connected to a pump 12, operated by a motor 13.

The manifold 10 may have a series of air distributing heads such as 14 extending upwardly therefrom and there may be in each case a series of heads, arranged in any preferred pattern within the compartment 9.

Figure 2:
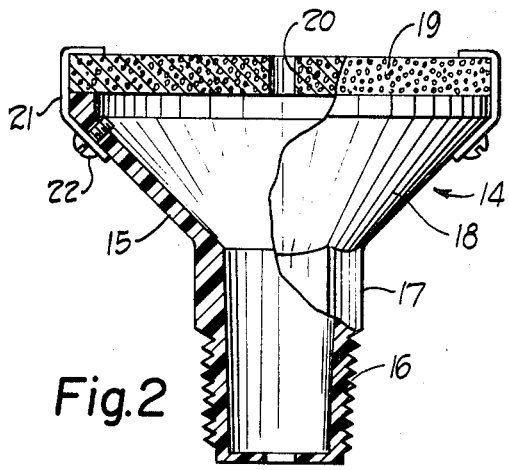
FIGURE 2 is a side view, partly in section illustrating an air distributing head constructed in accordance with this invention.
Figure 3:
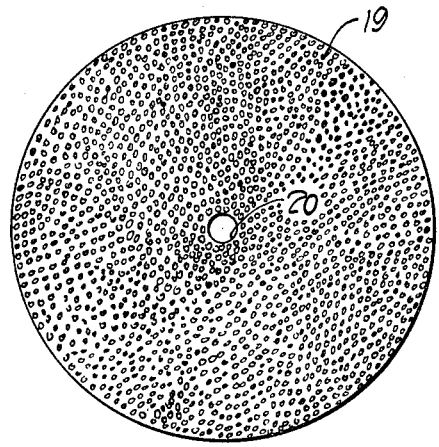
FIGURE 3 is a plan view of a face plate used on the head of FIGURE 2.

Noting FIGURE 2, the heads 14 are comprised of a body denoted 15, which is provided at its lower end with a threaded portion 16, a nut section 17 and an upwardly flared or divergent section 18 integral with the portions previously mentioned, the threads 16 being provided to facilitate placement and removal of the heads 14 from the manifold 10.

This body 15 may be formed of any plastic material which is inert to the sewage material and as indicated, is in turn provided with a face plate 19 of novel construction, this face place 19 being made of a highly uniform grade of porous ceramic material composed essentially of silica. The silica is a carefully selected quartz sand of high purity, having been graded by mechanical screening to produce the grade of permeability desired, several grades being usable and in this instance what may be termed a fine grade is provided.

The quartz sand is bonded together by a vitreous silicate which is fused at a very high temperature, to produce a strong rigid bond in the face plate 19.

As will be observed, the face plate is in the form of a disc of circular configuration, in this instance being about three inches in diameter and approximately one half inch thick, a relationship of about six to one, this having been found to be a preferable proportion as to the size and of the desired porosity to produce the necessary fine bubbles for the treatment system.

Located about centrally of the disc 19 is a suitable opening 20 which for the purposes hereof may be about nine thirty-seconds of an inch in diameter and thus approximately one tenth the overall diameter of the disc 19.

The disc or face plate 19 may be suitably affixed to the body 15 in any preferred manner as by bonding with any material which will effect such bond or be removably mounted as by the clips 21 maintained in position by suitable machine screws 22, there being a series of these clips around the periphery of the disc 19 as will be clearly understood.

Figure 4:
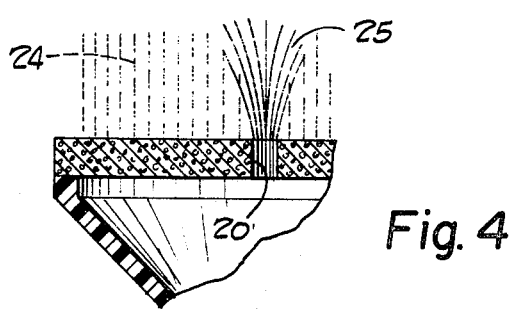
FIGURE 4 is a fragmentary view, partly in section, and intended to illustrate in somewhat greater detail the air distribution through the face plate.

With the foregoing description of the heads 14 in mind, reference is made now to FIGURES 1 and 4 which illustrate the use and distribution effected by said heads, of the air directed thereto by a pump 12 as previously mentioned.

The air entering into the body 15 at the lower end thereof will pass upwardly and through the disc 19 being broken up by the formation of the particles in the disc as previously described in detail, and thus producing a large mass of bubbles which are fine or of relatively small diameter and directed into the sewage mixture in the tank about as indicated by the dots 24.

It should be understood that the representation of the bubbles indicated by the dots 24 is necessarily only illustrative and does not precisely disclose the manner in which the bubbles are distributed. Suffice it to say the bubbles are provided in large quantities and directed into the mixture from the various heads 14.

This aeration of the mixture alone produces substantial improvement in the aerobic digestion process but in order to make the same even more effective, the openings 20 provide heavy or large streams of air through the heads 14 into the mixture which causes what may be termed a rolling action indicated by the dash lines 25 extending from each of the heads and thereabove, the representation of movement suggested by these lines likewise being only that and not intended to be precisely illustrative of the manner of effecting such rolling action.

In any event, the so-called rolling action is effected through the mixture and as an example, in a tank of eight foot depth and sixteen foot width, three cubic feet of air per minute should be directed to the heads, per lineal foot of tank, this effecting very satisfactory aeration of the mixture.

The fine nature of the bubbles will transfer large quantities of oxygen to the mixture and the finer the bubbles the more oxygen available for that purpose.

The large openings 20 in the heads 14 not only provide the roll desired to break up large masses of material into smaller particles for effective aeration but likewise prevent clogging of the face plate or disc 19 when aeration is not being effected.

As will be understood the large openings 20 in the heads 14, in permitting the direction of a heavy stream of air to the liquid, will provide large bubbles consequently, and while this gives more of a mixing action, the smaller interstices in the face plate generate finer bubbles, providing greater oxygen to the liquid mixture transfer.

The fineness of the bubble or broadly the permeability of the face plate, is determined, by several factors in the actual sewage disposal plant itself, and particularly in the aeration tanks, which are determined by considering the actual amount of attention which the disposal unit receives on the part of service people. As an example, a permeability of 60 (maximum pore diameter 200 microns) may be entirely satisfactory in a municipal plant where service is given daily and thus the clogging of the openings in the face plates is less likely to occur.

The less attention by service people to the units, the greater the permeability of the face plate so that where service is on a longer periodic basis, not daily, a permeability of 160 (maximum pore diameter 300 microns) may be suitable and where hardly any service is provided, a permeability of 320 (maximum pore diameter 500 microns) may be adopted.

The various grades of permeability, are established by the fineness of the silica which is incorporated in the face plates themselves.

One of the reasons for using varying grades of permeability, is that the on and off cycle which is usually availed of for sewage treatment effects periodic delivery of air through the face plates and through the large holes therein. When the air is off for a period of time, the weight of the sewage tends to force some of the solid particles into the face plate in order to equalize the static head in the air delivery pipes with the solution in the tanks.

It will thus be understood that one of the reasons for the relatively large holes in the center of the face plates, is the fact that in order to quickly equalize the static heads in the air supply pipes with the solution in the tanks, solution may move rapidly through the openings without causing so much pressure on the actual porous areas therearound. Similarly, as soon as the air is again delivered to the mixture, the mixture in the air pipes will be forced out rapidly through the large holes and thus not be required to pass through the finer interstices in the face plates themselves.

It will thus be seen that the relationship between the size of the large holes in the face plates and the area of the face plates themselves is important to provide for this rapid equalization of pressure on both sides of the face plate by the solution in the tank and in the air supply pipes when that takes place. If it were not for this rapid equalization the sewage particles would clog up the face plates and render them ineffective in a relatively short period of time unless servicing is effected for the reasons stated.

As indicated in FIGURE 4, the opening 20 permits the air to flow out as suggested by the lines 25 in contrast to the dots representing the bubbles 24 previously referred to.

The sewage admitted through the inlet 6 is treated in the compartment 9, treated liquid passing into the compartment 8 and thence to the outlet 7 in the usual manner of such systems.

The disclosure of this particular tank arrangement herein described is of course illustrative and not limiting since wherever aeration is to be accomplished in a system of this nature, the diffuser heads hereof are useful and may be varied as to their configuration and the air distributed through the face plates thereof in accordance with the desired treatment process to be effected.

I claim:

1. In a sewage treatment system of the class described, in combination, a tank to receive sewage for treatment therein, an inlet and an outlet for said tank, air supply means for said tank, air distributing means in the tank connected to said supply means, diffuser means in said tank, said diffuser means comprising a series of air distributing heads, each said head including a body connected to the distributing means, face plates for said heads, at least certain of said face plates being formed of a material having a large quantity of pores extending therethrough which will produce a formation of bubbles when air is forced through said pores, and cause the air bubbles to be directed to a sewage mixture in the tank, and means to simultaneously direct large streams of air to said mixture to roll the same, and thereby increase the effectiveness of the fine air bubbles, said means comprising a large opening through each of certain of said plates, each such opening having an area many times that of the largest pore.

2. The combination as claimed in claim 1, wherein each face plate is in the form of a disc having a thickness of about one-sixth of its diameter, each said disc being formed of a uniform grade of porous ceramic material particles bonded together, and said large openings being substantially centrally disposed with respect to said disc.

3. A combination as claimed in claim 2, wherein the opening is round and about one tenth the diameter of the disc.

References Cited

UNITED STATES PATENTS

| | | | |
|---|---|---|---|
| 1,117,601 | 11/1914 | Porter | 261—122 |
| 1,731,779 | 10/1929 | Houston | 261—122 |
| 2,038,451 | 4/1936 | Schattaneck | 261—122 |
| 2,911,205 | 11/1959 | Kraus | 261—122 |
| 3,083,953 | 4/1963 | Langdon et al. | 261—122 |

FOREIGN PATENTS

| | | |
|---|---|---|
| 731,213 | 3/1966 | Canada. |
| 571,970 | 1/1958 | Italy. |

HARRY B. THORNTON, *Primary Examiner.*

TIM R. MILES, *Assistant Examiner.*